United States Patent
Tour et al.

(10) Patent No.: US 12,300,818 B2
(45) Date of Patent: *May 13, 2025

(54) SULFURIZED CARBON CATHODES

(71) Applicant: William Marsh Rice University, Houston, TX (US)

(72) Inventors: James M. Tour, Houston, TX (US); Rodrigo Villegas Salvatierra, Houston, TX (US); Gladys Anahi Lopez Silva, Houston, TX (US); Abdul-Ramahn O. Raji, Houston, TX (US)

(73) Assignee: William Marsh Rice University, Houston, TX (US)

( * ) Notice: Subject to any disclaimer, the term of this patent is extended or adjusted under 35 U.S.C. 154(b) by 278 days.

This patent is subject to a terminal disclaimer.

(21) Appl. No.: 17/961,705

(22) Filed: Oct. 7, 2022

(65) Prior Publication Data

US 2023/0113503 A1    Apr. 13, 2023

Related U.S. Application Data

(63) Continuation of application No. 17/009,530, filed on Sep. 1, 2020, now Pat. No. 11,605,817.

(Continued)

(51) Int. Cl.
*H01M 4/583* (2010.01)
*H01M 4/38* (2006.01)
(Continued)

(52) U.S. Cl.
CPC ............ *H01M 4/583* (2013.01); *H01M 4/38* (2013.01); *H01M 4/623* (2013.01); *H01M 4/667* (2013.01);
(Continued)

(58) Field of Classification Search
CPC ........ H01M 4/583; H01M 4/38; H01M 4/623; H01M 4/667; H01M 10/0525; H01M 10/052; H01M 2004/028; H01M 4/625
See application file for complete search history.

(56) References Cited

U.S. PATENT DOCUMENTS 4,416,960 A    11/1983   Eustace et al.
5,162,175 A    11/1992   Visco et al.
(Continued)

FOREIGN PATENT DOCUMENTS

CN    104362394 A    2/2015
CN    107437632 A1   12/2017
(Continued)

OTHER PUBLICATIONS

Lu, L. et al. "Free-Standing Copper Nanowire Network Current Collector for Improving Lithium Anode Performance", Nano Lett. 2016, 16, 4431; 7 pages.

(Continued)

*Primary Examiner* — Stewart A Fraser
(74) *Attorney, Agent, or Firm* — Dickinson Wright PLLC; Ross Spencer Garsson

(57) ABSTRACT

Alkali metal-sulfur cells and batteries with cathode layers that store alkali metal charge carriers (e.g., lithium ions) in agglomerates of sulfurized carbon. The cathode layers lack costly and environmentally unfriendly nickel and cobalt. The cathode layers are composites that include agglomerates of sulfurized-carbon particles in a conductive binder and interconnected by $sp^2$-bonded carbon materials, such as carbon nanotubes or nanoribbons, that extend within the agglomerates and between the sulfurized-carbon particles.

19 Claims, 10 Drawing Sheets

Related U.S. Application Data

(60) Provisional application No. 62/905,535, filed on Sep. 25, 2019, provisional application No. 62/905,125, filed on Sep. 24, 2019.

(51) Int. Cl.
  *H01M 4/62* (2006.01)
  *H01M 4/66* (2006.01)
  *H01M 10/0525* (2010.01)
  *B82Y 35/00* (2011.01)
  *B82Y 40/00* (2011.01)

(52) U.S. Cl.
  CPC ......... *H01M 10/0525* (2013.01); *B82Y 35/00* (2013.01); *B82Y 40/00* (2013.01)

(56) References Cited

U.S. PATENT DOCUMENTS

| | | | |
|---|---|---|---|
| 5,426,006 | A | 6/1995 | Delnick et al. |
| 6,326,104 | B1 | 12/2001 | Caja et al. |
| 6,576,370 | B1 | 6/2003 | Nakagiri et al. |
| 6,908,706 | B2 | 6/2005 | Choi et al. |
| 7,250,233 | B2 | 7/2007 | Choi et al. |
| 7,291,424 | B2 | 11/2007 | Kim et al. |
| 8,665,581 | B2 | 3/2014 | Fleischer et al. |
| 8,709,373 | B2 | 4/2014 | Hauge et al. |
| 9,096,437 | B2 | 8/2015 | Tour et al. |
| 9,455,094 | B2 | 9/2016 | Tour et al. |
| 9,673,452 | B2 | 6/2017 | Zhang et al. |
| 9,774,204 | B2 | 9/2017 | Karim et al. |
| 9,853,284 | B2 | 12/2017 | Zhang et al. |
| 9,882,241 | B2 | 1/2018 | Singh et al. |
| 9,923,234 | B2 | 3/2018 | Eitouni et al. |
| 10,044,031 | B2 | 8/2018 | Zhang et al. |
| 10,044,064 | B2 | 8/2018 | Eitouni et al. |
| 10,056,618 | B2 | 8/2018 | Li et al. |
| 10,153,514 | B2 | 12/2018 | Pratt et al. |
| 10,170,251 | B2 | 1/2019 | Mitlin et al. |
| 10,505,180 | B2 | 12/2019 | Cairns |
| 10,629,894 | B2 | 4/2020 | Fanous et al. |
| 10,683,419 | B2 | 6/2020 | Helms et al. |
| 11,600,876 | B2 | 3/2023 | Gazda |
| 11,605,817 | B2 * | 3/2023 | Tour .................. H01M 4/38 |
| 2003/0113624 | A1 | 6/2003 | Kim et al. |
| 2003/0118908 | A1 | 6/2003 | Ishikawa et al. |
| 2009/0053594 | A1 | 2/2009 | Johnson et al. |
| 2009/0286163 | A1 | 11/2009 | Shin et al. |
| 2010/0159366 | A1 | 6/2010 | Shao-Horn et al. |
| 2011/0183206 | A1 | 7/2011 | Davis et al. |
| 2011/0262807 | A1 | 10/2011 | Boren et al. |
| 2011/0318654 | A1 | 12/2011 | Janssen |
| 2012/0077084 | A1 | 3/2012 | Christensen et al. |
| 2012/0171574 | A1 | 7/2012 | Zhamu et al. |
| 2012/0231326 | A1 | 9/2012 | Biswal et al. |
| 2013/0065050 | A1 | 3/2013 | Chen et al. |
| 2013/0065128 | A1 | 3/2013 | Li et al. |
| 2013/0141045 | A1 | 6/2013 | Karim et al. |
| 2013/0157128 | A1 | 6/2013 | Solan et al. |
| 2013/0164626 | A1 | 6/2013 | Manthiram et al. |
| 2013/0171502 | A1 | 7/2013 | Chen et al. |
| 2013/0183547 | A1 | 7/2013 | Kourtakis et al. |
| 2013/0196235 | A1 | 8/2013 | Prieto et al. |
| 2013/0202961 | A1 | 8/2013 | Hagen et al. |
| 2013/0220817 | A1 | 8/2013 | Walker et al. |
| 2013/0224594 | A1 | 8/2013 | Yushin et al. |
| 2013/0244097 | A1 | 9/2013 | Leitner et al. |
| 2013/0260246 | A1 | 10/2013 | Chen et al. |
| 2014/0014030 | A1 | 1/2014 | Tour et al. |
| 2014/0178688 | A1 | 6/2014 | Tour et al. |
| 2014/0234702 | A1 | 8/2014 | Zhang et al. |
| 2014/0313636 | A1 | 10/2014 | Tour et al. |
| 2014/0332731 | A1 | 11/2014 | Ma et al. |
| 2015/0010788 | A1 | 1/2015 | Aria et al. |
| 2015/0155549 | A1 | 6/2015 | Moganty et al. |
| 2015/0236372 | A1 | 8/2015 | Yushin et al. |
| 2015/0311508 | A1 | 10/2015 | Cairns |
| 2016/0141620 | A1 | 5/2016 | Cairns et al. |
| 2016/0240840 | A1 | 8/2016 | He et al. |
| 2016/0248084 | A1 | 8/2016 | Cairns et al. |
| 2016/0248087 | A1 * | 8/2016 | Kim .................. H01M 4/625 |
| 2016/0329559 | A1 | 11/2016 | Cairns et al. |
| 2017/0084960 | A1 | 3/2017 | Haag |
| 2017/0092932 | A1 | 3/2017 | Kim |
| 2017/0194636 | A1 | 7/2017 | Osada et al. |
| 2017/0233250 | A1 | 8/2017 | Cairns et al. |
| 2017/0279122 | A1 | 9/2017 | Helms et al. |
| 2017/0294646 | A1 | 10/2017 | Zhang et al. |
| 2017/0346084 | A1 | 11/2017 | Sakshaug et al. |
| 2017/0352909 | A1 | 12/2017 | Ainsworth et al. |
| 2018/0138504 | A1 | 5/2018 | Zhang et al. |
| 2018/0151884 | A1 | 5/2018 | Yushin et al. |
| 2018/0175379 | A1 | 6/2018 | Tour et al. |
| 2018/0183041 | A1 | 6/2018 | Tour et al. |
| 2018/0233784 | A1 | 8/2018 | Zhamu et al. |
| 2018/0287121 | A1 | 10/2018 | Kim et al. |
| 2018/0287162 | A1 | 10/2018 | Tour et al. |
| 2019/0177171 | A1 | 6/2019 | Troegel et al. |
| 2019/0181425 | A1 | 6/2019 | Tour et al. |
| 2019/0214685 | A1 | 7/2019 | Chang et al. |
| 2019/0229371 | A1 | 7/2019 | Song et al. |
| 2019/0386295 | A1 | 12/2019 | Zhamu et al. |
| 2019/0386332 | A1 | 12/2019 | Zhamu et al. |
| 2019/0386337 | A1 | 12/2019 | Zhamu et al. |
| 2020/0052290 | A1 | 2/2020 | He et al. |
| 2020/0099049 | A1 | 3/2020 | Cairns |
| 2020/0099054 | A1 | 3/2020 | Liu et al. |
| 2021/0036331 | A1 | 2/2021 | Korzhenko et al. |
| 2021/0202943 | A1 | 7/2021 | Tour et al. |

FOREIGN PATENT DOCUMENTS

| | | | |
|---|---|---|---|
| WO | 2010044437 | A1 | 4/2010 |
| WO | 2012040934 | A1 | 4/2012 |
| WO | 2013001693 | A1 | 3/2013 |
| WO | 2015084945 | A1 | 6/2015 |
| WO | 2015092957 | A1 | 6/2015 |
| WO | 2016159878 | A1 | 10/2016 |
| WO | 2016201101 | A1 | 12/2016 |
| WO | 2017011052 | A2 | 1/2017 |
| WO | 2017034650 | A2 | 3/2017 |
| WO | 2017062950 | A1 | 4/2017 |
| WO | 2017120391 | A1 | 7/2017 |
| WO | 2017164963 | A9 | 9/2017 |
| WO | 2018045226 | A1 | 3/2018 |
| WO | 2018140451 | A1 | 8/2018 |

OTHER PUBLICATIONS

Lu, Y. et al. "Stable Lithium Electrodeposition in Liquid and Nanoporous Solid Electrolytes". Nat. Mater. 2014, 13, 961-969 ("Lu 2014"); 9 pages.
Mahmood, N. et al. "Nanostructured Anode Materials for Lithium Ion Batteries: Progress, Challenge and Perspective". Adv. Energy Mater. 2016, 6, 1600374 ("Mahmood 2016"), 22 pages.
Manthiram, A. et al. "Lithium-Sulfur Batteries: Progress and Prospects". Adv. Mater. 2015, 27 (12), 1980-2006 ("Manthiram 2015"), 27 pages.
Markevich et al., "Review—On the Mechanism of Quasi-Solid-State Lithiation of Sulfur Encapsulated in Microporous Carbons: Is the Existence of Small Sulfur Molecules Necessary?", Journal of The Electrochemical Society, 164 (1) A6244-A6253, Dec. 13, 2016 (10 pages).
Murugan, R. et al. "Fast Lithium Ion Conduction in Garnet-Type $Li_7La_3Zr_2O_{12}$". Angew. Chem. Int. Ed. 2007, 46, 7778, 4 pages.
Noorden, R. "The Rechargeable Revolution: A Better Battery". Nature 2014, 507, 26-28 ("Noorden 2014"), 3 pages.
Osaka, T. et al. "Surface Characterization of Electrodeposited Lithium Anode with Enhanced Cycleability Obtained by CO2 Addition", J. Electrochem. Soc. 1997, 144 (5), 1709 ("Osaka 1997"), 6 pages.

(56) References Cited

OTHER PUBLICATIONS

Pang et al., "Advances in lithium-sulfur batteries based on multi-functional cathodes and electrolytes," Nature Energy | vol. 1 | Sep. 2016 | www.nature.com/natureenergy (11 pages).
Pang et al., Surface-enhanced redox chemistry of polysulphides on a metallic and polar host for lithium-sulphur batteries, Nature Communications | 5:4759 | DOI: 10.1038/ncomms5759 www.nature.com/naturecommunications, Aug. 16, 2014 (8 pages).
Peigney, A. et al. "Specific Surface Area of Carbon Nanotubes and Bundles of Carbon Nanotubes". Carbon 2001, 39, 507-514 ("Peigney 2001"), 9 pages.
Qian, J. et al. "High Rate and Stable Cycling of Lithium Metal Anode". Nat. Commun. 2015, 6, 6362 ("Qian 2015"), 9 pages.
Ren, Z. et al. "Synthesis of Large Arrays of Well-Aligned Carbon Nanotubes on Glass". Science 1998, 282, 1105-1107 ("Ren 1998"), 4 pages.
Roy, P. et al. "Nanostructured Anode Materials for Lithium Ion Batteries". J. Mater. Chem. A 2015, 3, 2454-2484 ("Roy 2015"), 31 pages.
Salvatierra, R. et al. "Graphene Carbon Nanotube Carpets Grown Using Binary Catalysts for High-Performance Lithium-Ion Capacitors". ACS Nano 2017, 11, 2724-2733 ("Salvatierra 2017"), 10 pages.
Schuster et al., "Spherical Ordered Mesoporous Carbon Nanoparticles with High Porosity for Lithium-Sulfur Batteries," Angew. Chem. Int. Ed. 2012, 51, 3591-3595 (5 pages).
Stone, G. et al. "Resolution of the Modulus Versus Adhesion Dilemma in Solid Polymer Electrolytes for Rechargeable Lithium Metal Batteries", J. Electrochem. Soc. 2012, 159, A222, 7 pages.
Sun, Z. et al. "Large-Area Bernal-Stacked Bi-, Tri-, and Tetralayer Graphene". ACS Nano 2012, 6, 9790-9796 ("Sun 2012"), 7 pages.
Thess, A. et al. "Crystalline Ropes of Metallic Carbon Nanotubes", Science 1996, 273, 483-487 ("Thess 1996"), 6 pages.
Tung, S. et al. "A Dendrite-Suppressing Composite Ion Conductor from Aramid Nanofibres". Nat. Commun. 2015, 6, 6152 ("Tung 2015"), 7 pages.
Wang, C. et al. "Suppression of Lithium-Dendrite Formation by Using LAGP-PEO (LiTFSI) Composite Solid Electrolyte and Lithium Metal Anode Modified by PEO (LiTFSI) in All-Solid-State Lithium Batteries", ACS Appl. Mater. Interfaces 2017, acsami.7b00336 ("Wang 2017"); 9 pages.
Wei, S. et al. "Metal-Sulfur Battery Cathodes Based on Pan-Sulfur Composites", J. Am. Chem. Soc. 2015, 137, 12143-12152 ("Wei 2015"); 10 pages.
Whittingham, M. "History, Evolution, and Future Status of Energy Storage". Proc. IEEE 2012, 100 (Special Centennial Issue), 1518-1534 ("Whittingham 2012"), 17 pages.
Xu, W. et al. "Lithium Metal Anodes for Rechargeable Batteries", Energy Environ. Sci. 2014, 7 (2), 513-537 ("Xu 2014"); 25 pages.
Yan, K. et al. "Selective Deposition and Stable Encapsulation of Lithium through Heterogeneous Seeded Growth", Nat. Energy 2016, 1, 16010 ("Yan 2016"); 8 pages.
Yang, C. et al. "Accommodating Lithium into 3D Current Collectors with a Submicron Skeleton Towards Long-Life Lithium Metal Anodes". Nat. Commun. 2015, 6, 8058 ("Yang 2015"), 9 pages.
Yazami, R. et al. "A Reversible Graphite-Lithium Negative Electrode for Electrochemical Generators", J. Power Sources 1983, 9, 365-371 ("Yazami 1983"); 7 pages.
Zhang, H. et al. "Three-Dimensional Bicontinuous Ultrafast-Charge and -Discharge Bulk Battery Electrodes", Nat. Nanotechnol. 2011, 6, 277-281 ("Zhang 2011"); 5 pages.
Zhang, J. et al. "Lithium Metal Anodes and Rechargeable Lithium Metal Batteries", 1st ed.; Hull, R. et al., Eds.; Chapter 4, Springer International Publishing, 2017 ("J. Zhang 2017"); 26 pages.
Zhang, R. et al. "Conductive Nanostructured Scaffolds Render Low Local Current Density to Inhibit Lithium Dendrite Growth". Adv. Mater. 2016, 28, 2155-2162 ("Zhang 2016"), 8 pages.
Zhang, S. et al. "Charge and Discharge Characteristics of a Commercial LiCoO2-Based 18650 Li-Ion Battery", J. Power Sources 2006, 160, 1403-1409 ("Zhang 2006"); 7 pages.
Zhang, Y. et al. "A Carbon-Based 3D Current Collector with Surface Protection for Li Metal Anode", Nano Res. 2017, 10, 1356-1365 ("Y. Zhang II 2017"); 11 pages.
Zhang, Y. et al. "High-Capacity, Low-Tortuosity, and Channel-Guided Lithium Metal Anode". Proc. Natl. Acad. Sci. U.S.A. 2017, 114, 3584-3589 ("Y. Zhang I 2017"), 6 pages.
Zheng, G. et al. "Interconnected Hollow Carbon Nanospheres for Stable Lithium Metal Anodes", Nat. Nanotechnol. 2014, advance on (8), 618-623 ("Zheng 2014"); 6 pages.
Zhou, W. et al. "Plating a Dendrite-Free Lithium Anode with a Polymer/Ceramic/Polymer Sandwich Electrolyte", J. Am. Chem. Soc. 2016, 138 (30), 9385-9388 ("Zhou 2016"); 4 pages.
International Searching Authority, International Search Report and Written Opinion for PCT/US2021/24259, date of mailing Jun. 25, 2021; 8 pages.
Cavallo et al. "A free-standing reduced graphene oxide aerogel as supporting electrode in a fluorine-free Li2S8 catholyte Li—S battery," Journal of Power Sources, Feb. 5, 2019, 7 pages.
Chebiam et al. "Comparison of the chemical stability of the high energy density cathodes of lithium-ion batteries," Electrochemistry Communications 2001, 3 (11), 624-627, 4 pages.
Cheon et al. "Rechargeable Lithium Sulfur Battery: II. Rate Capability and Cycle Characteristics," Journal of The Electrochemical Society 2003, 150 (6), A800-A805, 5 pages.
Fanous, J., et al., "Structure-Related Electrochemistry of Sulfur-Poly(acrylonitrile) Composite Cathode Materials for Rechargeable Lithium Batteries", Chermistry of Materials, American Chemical Society 2011, 5 pages.
Holstiege et al. "Pre-Lithiation Strategies for Rechargeable Energy Storage Technologies: Concepts, Promises and Challenges," Batteries, Jan. 23, 2018, 39 pages.
Hutchins, Mark "New chemistry promises better lithium sulfur batteries," PV Magazine, Jun. 22, 2020, 5 pages.
Ji et al. "Advances in Li—S batteries," Journal of Materials Chemistry 2010, 20 (44), 9821-9826, 6 pages.
Jin et al., "Covalently Connected Carbon Nanostructures for Current Collectors in Both the Cathode and Anode of Li—S Batteries," Advanced Materials, 2016, 9 pages (9094-9102).
Kang et al. "Cathode porosity is a missing key parameter to optimize lithium-sulfur battery energy density," Nature Communications, Oct. 10, 2019, 10 pages.
Kim et al. "A fast and efficient pre-doping approach to high energy density lithium-ion hybrid capacitors," Journal of Materials Chemistry A of The Royal Society of Chemistry, Mar. 2014, 6 pages (10029-10033).
Kumari et al. "Structural and electrical properties of amorphous carbon-sulfur composite films," Bull. Mater. Sci., vol. 27, No. 3, Jun. 2004, pp. 289-294.
Luo et al., "A chemically stabilized sulfur cathode for lean electrolyte lithium sulfur batteries," Proceedings of the National Academy of Sciences (PNAS.org), May 15, 2020, 9 pages.
Mikhaylik et al. "Polysulfide Shuttle Study in the Li/S Battery System," Journal of The Electrochemical Society 2004, 151 (11), A1969-A1976, 9 pages.
Othman, Arwa "Preparation of Sulfurized Granular Activated Carbon from Beji Asphalt Using Concentrated H2so4," Tikrit Journal of Pure Science, vol. 13 No. (3), 2008, 7 pages.
Su et al. "Lithium-sulfur batteries with a microporous carbon paper as a bifunctional interlayer," Nature Communications 2012, 3, 1166, 6 pages.
Wikipedia "Lithium-sulfur battery," Retrieved from https://en.wikipedia.org/w/index.php?title=Lithium-sulfur_battery&oldid=963354052, last edited on Jun. 19, 2020, at 10:29 (UTC), 9 pages.
Yan et al. "Three-Dimensional Metal Graphene Nanotube Multi-functional Hybrid Materials," ACS Nano 2013, 7, 58-64. DOI: 10.1021/nn3015882, 7 pages.
Yang et al. "Nanostructures sulfur cathodes," Chem Soc Rev of The Royal Society of Chemistry, Jul. 2012, 15 pages (3018-3032).
Zhang et al. "A carbon nanofiber network for stable lithium metal anodes with high Coulombic efficiency and long cycle life," Tsinghua University Press Springer, Nano Research DOI 10.1007/s12274-016-1219-2, Jul. 17, 2016; 9 pages.

(56) References Cited

OTHER PUBLICATIONS

Zhang et al. "Enhancement of long stability of sulfur cathode by encapsulating sulfure into micropores of carbon spheres," Energy & Environmental Science, 2010, 3, 1531-1537.
Zhang, Sheng S., "Sulfurized carbon: a class of cathode materials for high performance lithium/sulfur batteries," Frontiers in Energy Research, Dec. 2013, 10 pages.
Zheng et al. "In Situ formed lithium sulfide/microporous carbon cathodes for lithium-ion batteries," ACS Nano, vol. 7, No. 12, 2013, pp. 10995-11003.
Zhu et al. "A seamless three-dimensional carbon nanotube graphene hybrid material," Nature Communications 2012, 3, 1225, 7 pages.
European Patent Office, European Search Report for Application No. 21163573.5, dated Sep. 13, 2021, 13 pages.
Armand, M. et al. "Building Better Batteries", Nature 2008, 451 (7179), 652-657 ("Armand 2008"), 6 pages.
Aurbach, D. et al. "A Short Review of Failure Mechanisms of Lithium Metal and Lithiated Graphite Anodes in Liquid Electrolyte Solutions" Solid State Ionics 2002, 148, 405-416 ("Aurbach 2002"), 12 pages.
Bai, P. et al. "Transition of Lithium Growth Mechanisms in Liquid Electrolytes" Energy Environ. Sci. 2016, 9, 3221-3229 ("Bai 2016"), 9 pages.
Basile, A. et al. "Stabilizing Lithium Metal Using Ionic Liquids for Long-Lived Batteries". Nature Comm. 2016, 7, 11794, 11 pages.
Bates, J. et al. "Fabrication and Characterization of Amorphous Lithium Electrolyte Thin Films and Rechargeable Thin-Film Batteries". J. Power Sources 1993, 43 (1-3), 103-110 ("Bates 1993"), 8 pages.
Bates, J. et al. "Thin-film Lithium and Lithium-Ion Batteries", Solid State Ionics 2000, 135, 33-45; 13 pages.
Besenhard, J. et al. "Inorganic Film-Forming Electrolyte Additives Improving the Cycling Behaviour of Metallic Lithium Electrodes and the Self-Discharge of Carbon-Lithium Electrodes". J. Power Sources 1993, 44 (1-3), 413-420 ("Besenhard 1993"), 8 pages.
Bouchet, R. "Batteries: A Stable Lithium Metal Interface". Nat. Nanotechnol. 2014, 9, 572-573 ("Bouchet 2014"), 2 pages.
Bouchet, R. et al. "Single-Ion BAB Triblock Copolymers as Highly Efficient Electrolytes for Lithium-Metal Batteries", Nature Mater. 2013, 12, 452; 6 pages.
Bruce, P. et al. "Li—O2 and Li—S Batteries with High Energy Storage", Nat. Mater. 2011, 11 (2), 172-172 ("Bruce 2011"). 12 pages.
Chen et al., "Vertically Aligned Carbon Nanofibers on Cu Foil as a 3D Current Collector for Reversible Li Plating/Stripping toward High-Performance Li—S Batteries," Adv. Funct. Mater. 2020, Published Nov. 4, 2019 (12 pages).
Claye, A. et al. "Solid-State Electrochemistry of the Li Single Wall Carbon Nanotube System". J. Electrochem. Soc. 2000, 147, 2845-2852 ("Claye 2000"), 9 pages.
Cohen, Y. et al. "Micromorphological Studies of Lithium Electrodes in Alkyl Carbonate Solutions Using in Situ Atomic Force Microscopy". J. Phys. Chem. B 2000, 104 (51), 12282-12291 ("Cohen 2000"), 10 pages.
Crowther, O. et al. "Effect of Electrolyte Composition on Lithium Dendrite Growth", J. Electrochem. Soc. 2008, 155, A806-A811 ("Crowther 2008"), 7 pages.
Ding, F. et al. "Dendrite-Free Lithium Deposition via Self-Healing Electrostatic Shield Mechanism", J. Am. Chem. Soc. 2013, 135 (11), 4450-4456 ("Ding II 2013"), 7 pages.
Ding, F. et al. "Effects of Carbonate Solvents and Lithium Salts on Morphology and Coulombic Efficiency of Lithium Electrode". J. Electrochem. Soc. 2013, 160 (10), A1894-A1901 ("Ding I 2013"), 9 pages.
Dresselhaus, M. et al. "Raman Spectroscopy on Isolated Single Wall Carbon Nanotubes". Carbon 2002, 40, 2043-2061 ("Dresselhaus 2002"), 19 pages.
Dunn, B. et al. "Electrical Energy Storage for the Grid: A Battery of Choices". Science (80). 2011, 334 (6058), 928-935 ("Dunn 2011"), 9 pages.

Ebbesen, T. et al. "Electrical Conductivity of Individual Carbon Nanotubes". Nature 1996, 382, 54-56 ("Ebbesen 1996"), 3 pages.
Evarts, E. "Lithium Batteries: To the Limits of Lithium". Nature 2015, 526, S93-S95 ("Evarts 2015") 4 pages.
Evers, S., et al., "New Approaches for High Energy Density Lithium-Sulfur Battery Cathodes," vol. 46, No. 5, Oct. 10, 2012, pp. 1135-1143, Accounts of Chemical Research (9 pages).
Girishkumar, G. et al. "Lithium-Air Battery: Promise and Challenges". J. Phys. Chem. Lett. 2010, 1 (14), 2193-2203 ("Girishkumar 2010"); 11 pages.
Goodenough, J. et al., "The Li-Ion Rechargeable Battery: A Perspective". J. Am. Chem. Soc. 2013, 135 (4), 1167-1176 ("Goodenough 2013") 10 pages.
Hao, X. et al., "Ultrastrong Polyoxyzole Nanofiber Membranes for Dendrite-Proof and Heat-Resistant Battery Separators". Nano Lett. 2016, 16, 2981-2987 ("Hao 2016"), 7 pages.
Hirai, T. et al. "Effect of Additives on Lithium Cycling Efficiency". J. Electrochem. Soc. 1994, 141, 2300-2305 ("Hirai 1994"), 7 pages.
Hou, J. et al."Graphene-based electrochemical energy conversion and storage: fuel cells, supercapacitors and lithium ion batteries", Physical Chemistry Chemical Physics, vol. 13, No. 34, Jan. 1, 2011, pp. 15384-15402.; 19 pages.
Ji et al., "A highly ordered nanostructured carbon-sulphur cathode for lithium-sulphur batteries," Nature Materials, vol. 8, Jun. 2009, www.nature.com/naturematerials (7 pages).
Ji et al., "Stabilizing lithium-sulphur cathodes using polysulphide reservoirs," nature communications, DOI: 10.1038/ncomms 1293, www.nature.com/naturecommunications, May 24, 2011 (7 pages).
Jin, S. et al. "Efficient Activation of High-Loading Sulfur by Small CNTs Confined Inside a Large CNT for High-Capacity and High-Rate Lithium-Sulfur Batteries". Nano Lett. 2015, acs.nanolett. 5b04105 ("Jin 2015"), 8 pages.
Kalybekkyzy et al., Electrospun 3D Structured Carbon Current Collector for Li/S Batteries, 2, 10 Nanomaterials, vol. 10, Apr. 14, 2020 [retrieved on Jul. 26, 2022]. Retrieved from the internet: <URL:https://www.ncbi.nlm.nih.gov/pmc/articles/PMC7221739/pdf/nanomaterials-10-00745.pdf>. 13 pages.
Kamaya, N. et al. "A Lithium Superionic Conductor," Nature Mater. 2011, 10, 682; 5 pages.
Kanno, R. et al. "Lithium Ionic Conductor Thio-LISICON: the Li2SGeS2P2S5 System", J. Electrochem. Soc. 2001, 148, A742. 6 pages.
Kaskel, "Lithium-Sulfur Batteries: Current Achievements and Further Development," Batteries & Supercaps 2022, 5, e202200467 (1 of 3), (3 pages).
Kim, J. et al. "Controlled Lithium Dendrite Growth by a Synergistic Effect of Multilayered Graphene Coating and an Electrolyte Additive", Chem. Mater. 2015, 27 (8), 2780-2787 ("Kim 2015"), 8 pages.
Kozen, A. et al. "Next-Generation Lithium Metal Anode Engineering via Atomic Layer Deposition", ACS Nano 2015, 9 (6), 5884-5892 ("Kozen 2015"), 9 pages.
Landi, B. et al. "Carbon Nanotubes for Lithium Ion Batteries". Energy Environ. Sci. 2009, 2, 638-654 ("Landi 2009"), 18 pages.
Landi, B. et al. "Lithium Ion Capacity of Single Wall Carbon Nanotube Paper Electrodes", J. Phys. Chem. C 2008, 112, 7509-7515 ("Landi 2008"); 7 pages.
Lee, H. et al. "A Simple Composite Protective Layer Coating that Enhances the Cycling Stability of Lithium Metal Batteries", J. Power Sources 2015, 284, 103-108 ("Lee 2015"); 6 pages.
Li et al., "A high-energy sulfur cathode in carbonate electrolyte by eliminating polysulfides via solid phase lithium-sulfur transformation," Nature Communications | (2018) 9:4509 | DOI: 10.1038/s41467-018-06877-9 | www.nature.com/naturecommunications (10 pages).
Li, F. et al. "Identification of the Constituents of Double-Walled Carbon Nanotubes Using Raman Spectra Taken with [81 Different Laser-Excitation Energies". J. Mater. Res. 2003, 18, 1251-1258 ("Li 2003"), 9 pages.
Li, N. et al. "An Artificial Solid Electrolyte Interphase Layer for Stable Lithium Metal Anodes". Adv. Mater. 2016, 28 (9), 1853-1858 ("Li 2016"), 7 pages.

(56) References Cited

OTHER PUBLICATIONS

Li, W. et al. "The Synergetic Effect of Lithium Polysulfide and Lithium Nitrate to Prevent Lithium Dendrite Growth". Nat. Commun. 2015, 6 (May), 7436 ("Li 2015"), 8 pages.

Liang et al., "A highly efficient polysulfide mediator for lithium-sulfur batteries," Nature Communications | 6:5682 | DOI: 10.1038/ncomms6682 |www.nature.com/naturecommunications, Jan. 6, 2015 (8 pages).

Liang, Z. et al. "Composite Lithium Metal Anode by Melt Infusion of Lithium into a 3D Conducting Scaffold with Lithiophilic Coating". Proc. Natl. Acad. Sci. U. S. A. 2016, 113, 2862-2867 ("Liang 2016"), 6 pages.

Lin, D. et al. "Layered Reduced Graphene Oxide with Nanoscale Interlayer Gaps as a Stable Host for Lithium Metal Anodes", Nat. Nanotechnol. 2016, 11, 626-632 ("Lin 2016"); 8 pages.

Lin, D. et al. "Reviving the Lithium Metal Anode for High-Energy Batteries", Nat. Publ. Gr. 2017, 12 (3), 194-206 ("Lin I 2017"); 13 pages.

Lin, D. et al. "Three-Dimensional Stable Lithium Metal Anode with Nanoscale Lithium Islands Embedded in Ionically Conductive Solid Matrix". Proc. Natl. Acad. Sci. U. S. A. 2017, 114, 4613-4618 ("Lin II 2017"), 6 pages.

Lin, J. et al. "3-Dimensional Graphene Carbon Nanotube Carpet-Based Microsupercapacitors with High Electrochemical Performance", Nano Lett. 2013, 13, 72-78 ("Lin 2015"); 7 pages.

Liu, Y. et al. "An Artificial Solid Electrolyte Interphase with High Li-Ion Conductivity, Mechanical Strength, and Flexibility for Stable Lithium Metal Anodes". Adv. Mater. 2017, 29, 1605531 ("Liu 2017"), 8 pages.

Liu, Y. et al. "Lithium-Coated Polymeric Matrix as a Minimum Volume-Change and Dendrite-Free Lithium Metal Anode", Nat. Commun. 2016, 7, 10992 ("Liu 2016"), 9 pages.

\* cited by examiner

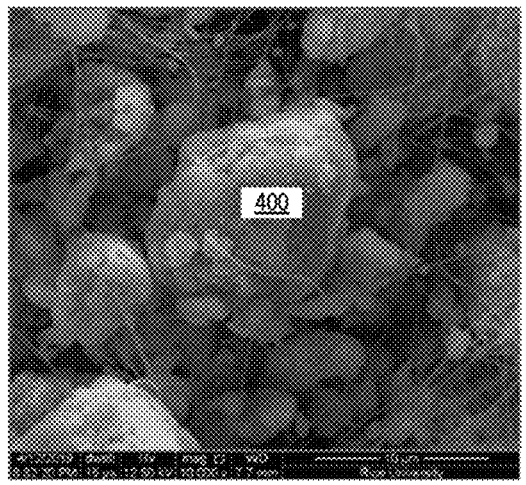
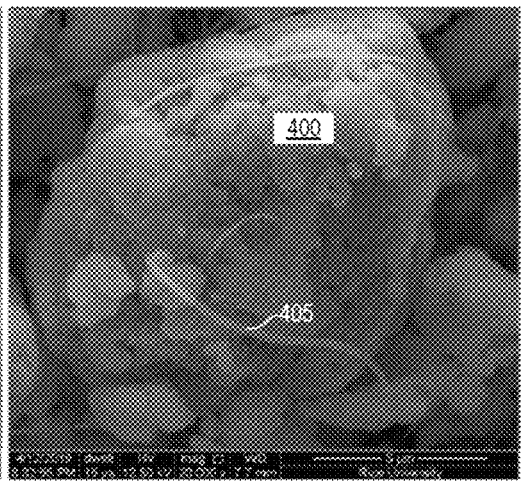
FIG. 4A　　　　　　　FIG. 4B
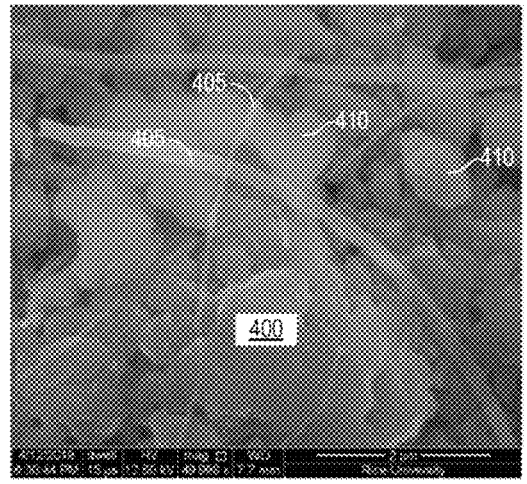
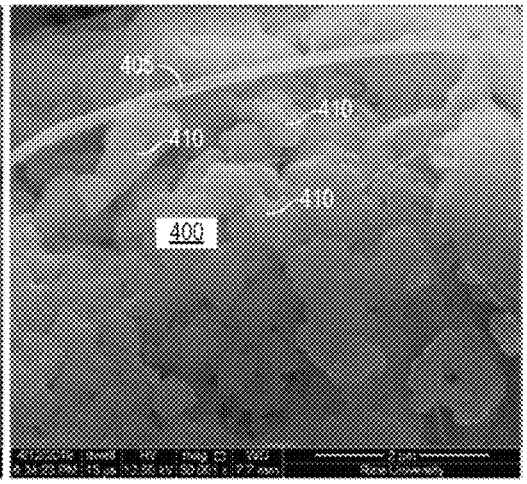
FIG. 4C　　　　　　　FIG. 4D

SULFURIZED CARBON CATHODES

CROSS-REFERENCE TO RELATED PATENT APPLICATIONS

This application is a continuation patent application of and claims priority and benefit to U.S. patent application Ser. No. 17/009,530, filed Sep. 1, 2020, which claims priority to U.S. Patent Appl. Ser. No. 62/905,125, filed Sep. 24, 2019, and U.S. Patent Appl. Ser. No. 62/905,535, filed Sep. 25, 2019, each entitled "Sulfurized Carbon Cathodes," which patent applications are commonly owned by the owner of the present invention. These patent applications are incorporated herein in their entirety.

GOVERNMENT INTEREST

This invention was made with government support under Grant No. FA9550-14-1-0111, awarded by the United States Department of Defense/Air Force Office of Scientific Research. The United States government has certain rights in the invention.

TECHNICAL FIELD

The present invention relates to sulfurized carbon cathodes, and more particularly to alkali metal-sulfur cells and batteries with cathode layers that store alkali metal charge carriers (e.g., lithium ions) in agglomerates of sulfurized carbon.

BACKGROUND

An electric battery includes one or more electric cells. Each cell includes a positive terminal (cathode) and a negative terminal (anode) physically separated by an ion conductor (electrolyte). When a cell is discharged to power an external circuit, the anode supplies negative charge carriers (electrons) to the cathode via the external circuit and positive charge carriers (cations) to the cathode via the internal electrolyte. During charging, an external power source drives electrons from the cathode to the anode via the power source and the resultant charge imbalance pulls cations from the cathode to the anode via the electrolyte.

Lithium-ion (Li-ion) batteries store charge in the anode as Li cations (aka Li ions). Li-ion batteries are rechargeable and ubiquitous in mobile communications devices and electric vehicles due to their high energy density, a lack of memory effect, and low self-discharge rate. Lithium-metal batteries store charge in the anode as lithium metal. Li-metal batteries have superior power density but are generally not rechargeable. Lithium ions are the positive charge carriers that travel to and are stored in the cathode during discharge in both Li-ion and Li-metal batteries.

Li-ion and Li-metal batteries offer excellent performance. There nevertheless exist demands for improvements along every metric of battery price and performance. Moreover, the cathodes in most popular lithium-based batteries include cobalt and nickel, both of which are mined at considerable financial and environmental cost. Also important, these materials are not distributed evenly across the globe, leading to fears of scarcity, supply disruptions, and concomitant political and economic instabilities. Cobalt is particularly troublesome because supply is located predominantly in the conflict-torn Democratic Republic of Congo and supply is dominated by a small number of companies. There is therefore a strong demand for battery components that reduce or eliminate the needs for cobalt and nickel.

SUMMARY

In general, in one embodiment, the invention features an energy-storage device. The device includes an anode and a cathode. The cathode includes distinct agglomerates of sulfurized-carbon particles. The sulfurized-carbon particles include carbon atoms with adjacent sulfur atoms. A majority of the carbon atoms with the adjacent sulfur atoms are bonded to the adjacent sulfur atoms via carbon-sulfur bonds. The cathode further includes a carbon nanomaterial extending within the agglomerates of sulfurized-carbon particles and between the sulfurized-carbon particles.

Implementations of the invention can include one or more of the following features:

The carbon nanomaterials can be covalently bonded to the sulfurized-carbon particles.

At least 90% of the carbon atoms with the adjacent sulfur atoms can be bound to the adjacent sulfur atoms via carbon-sulfur bonds.

The device can further include a binder within which the agglomerates are distributed.

The particles can include less than 10% oxygen in mass ratio.

The agglomerates of sulfurized-carbon particles can be ellipsoid.

The agglomerates of sulfurized-carbon particles can have average principal axes of between 500 nanometers and 5,000 nanometers.

The sulfurized-carbon particles can be ellipsoid.

The sulfurized-carbon particles can have average principal axes of less than one micron.

The average of the principal axes of the sulfurized-carbon particles can be between 50 nanometers and 250 nanometers.

The carbon nanomaterial can extend within and between the sulfurized-carbon particles.

The carbon nanomaterial can include at least one of nanotubes and nanoribbons.

The sulfurized-carbon particles can store an alkali metal.

The sulfurized-carbon particles can consist primarily of the sulfur.

The sulfurized-carbon particles can consist essentially of carbon and sulfur.

The carbon can include the carbon nanomaterial and carbon covalently bonded to the sulfur.

The agglomerates of sulfurized-carbon particles can have a mass ratio of the carbon covalently bonded to the sulfur and the carbon nanomaterial greater than one.

The mass ratio can be greater than ten.

Essentially all the sulfur in the agglomerates of sulfurized-carbon particles can be bonded to the carbon before cycling of the energy storage device.

In general, in another embodiment, the invention features a method of making an electrode for an energy-storage device. The method includes combining sulfurized-carbon particles with carbon nanomaterial to form agglomerates of sulfurized-carbon particles. The agglomerates of sulfurized-carbon particles include carbon atoms with adjacent sulfur atoms. A majority of the carbon atoms with the adjacent sulfur atoms are bonded to adjacent sulfur atoms via carbon-sulfur bonds. The carbon nanomaterial extends within the agglomerates of sulfurized-carbon particles and between the sulfurized-carbon particles.

Implementations of the invention can include one or more of the following features:

The method can further include heating the sulfurized-carbon particles with carbon nanomaterial to produce the agglomerates.

The method can further include combining the agglomerates of sulfurized-carbon particles with a solvent to produce a slurry.

The method can further include spreading the slurry on a current collector and drying the slurry on the current collector.

Producing the slurry can include combining the agglomerates of sulfurized-carbon particles with a binder and a conductive carbon additive.

The method can further include lithiating the agglomerates of sulfurized-carbon particles before incorporating the electrode into the energy-storage device.

The method can further include forming the sulfurized-carbon particles. The forming can include combining sulfur with a polymer and pyrolyzing the polymer with the sulfur.

The combining sulfur with the polymer can include milling the sulfur with the polymer.

The method can further include forming the sulfurized-carbon particles, with the forming including pyrolyzing a mixture of a polymer, sulfur, and the carbon nanomaterial.

BRIEF DESCRIPTION OF THE DRAWINGS

The subject matter disclosed is illustrated by way of example, and not by way of limitation, in the figures of the accompanying drawings and in which like reference numerals refer to similar elements and in which:

FIGS. 4A-4D are SEM images that illustrate the morphology of agglomerates produced in a method such as shown in FIG. 2 but in which MWCNT powder is added to a sulfurized-carbon mixture prepared without MWCNT through mixing, milling, and heating processes.

DETAILED DESCRIPTION

Figure 1:
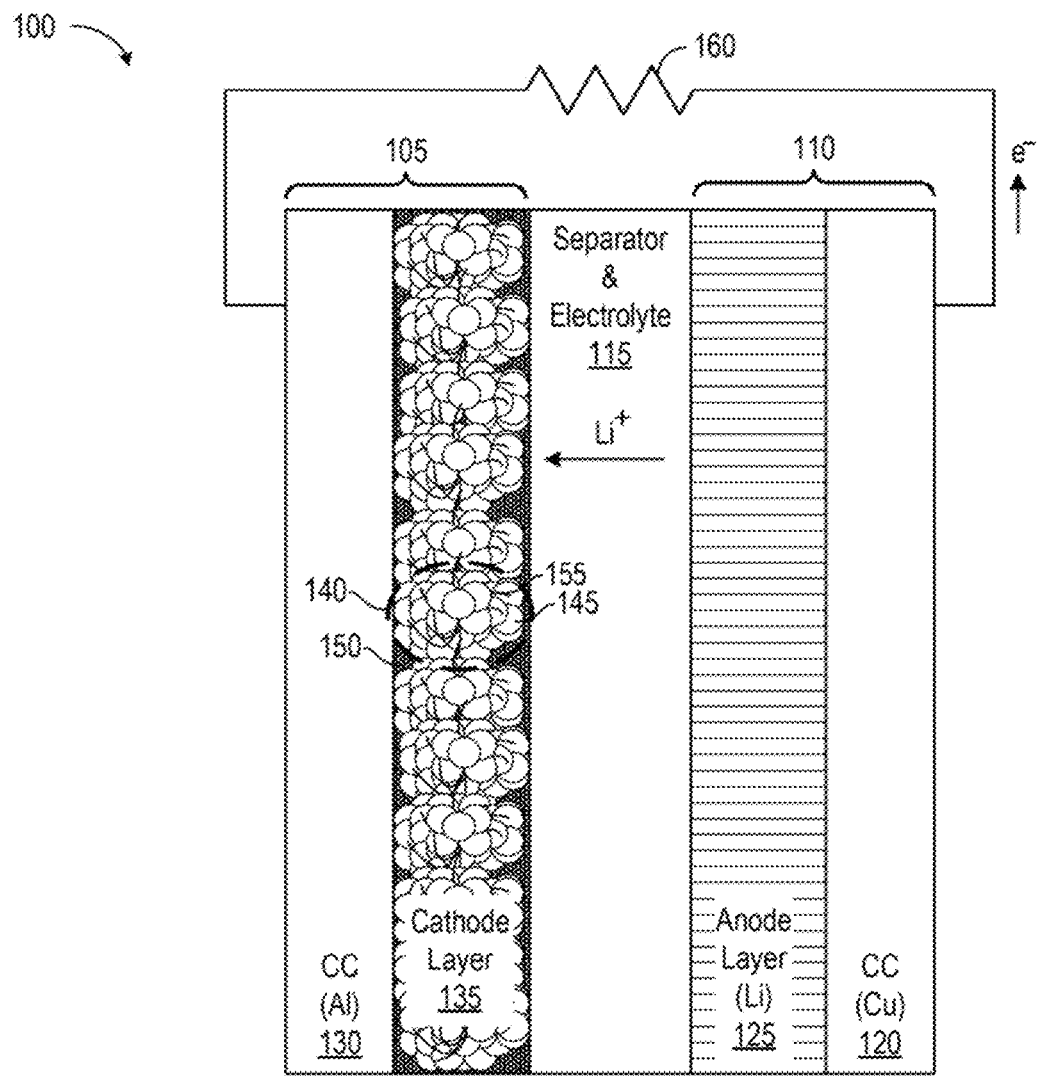
FIG. 1 depicts an energy-storage device in accordance with an embodiment that eschews cobalt and nickel in favor of inexpensive and readily available sulfur and carbon.
Figure 1:
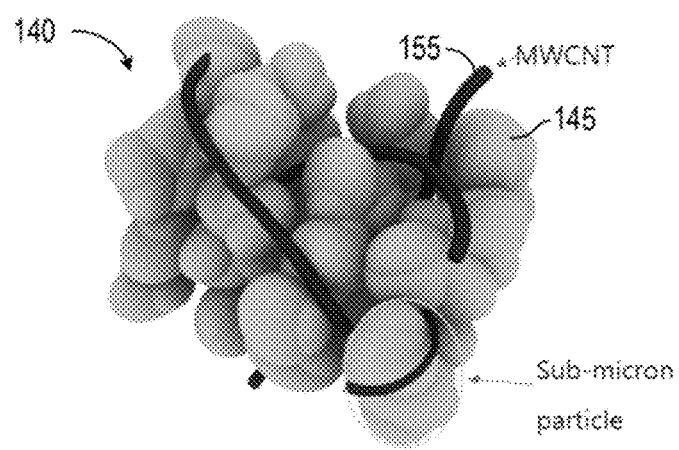

FIG. 1 depicts an energy-storage device 100, a lithium or lithium-ion cell, in accordance with an embodiment that eschews cobalt and nickel in favor of inexpensive and readily available sulfur and carbon. Device 100 includes a cathode 105 separated from an anode 110 via an electrolyte 115 with a separator (not shown) of, e.g., a porous polymer. Anode 110 includes a current collector 120 of, e.g., copper physically and electrically connected to an anode layer 125 of lithium metal or a combination of lithium metal or lithium ions and some form of porous carbon. Cathode 105 includes a current collector 130 of, e.g., aluminum physically and electrically connected to a cathode layer 135. Cathode layer 135 is a composite that includes distinct agglomerates 140 of sulfurized-carbon particles 145 distributed in a binder 150 and interconnected by $sp^2$-bonded carbon nanomaterials 155, such as carbon nanotubes or nanoribbons. Binder 150 physically and electrically connects agglomerates 140. Sulfurized-carbon particles 145 have high concentrations of sulfur, greater than 65 wt % in some embodiments. A majority of the carbon atoms with adjacent sulfur atoms, including those carbon atoms of carbon nanomaterials 155, are bonded to the adjacent sulfur atoms via covalent carbon-sulfur bonds that suppress the formation of undesirable soluable polysulfides.

Lithium in anode layer 125 is oxidized (electron loss) during cell discharge to power a load 160 external to the cell. Electrons pass from anode layer 125 to cathode layer 135 via current collectors 120 and 130 and load 160, and lithium cations (Lit) from anode layer 125 pass to cathode layer 135 via electrolyte 115 where they are reduced (electron gain) within agglomerates 140 as lithium polysulfide salts. Charging reverses this process by stripping lithium ions and electrons from agglomerates 140 and returning them to anode layer 125.

Conventional lithium-sulfur (Li—S) cells lose sulfur from the active cathode layer when elemental sulfur reacts with the lithium ions in the electrolyte to form soluble lithium polysulfides. In this deleterious process, sometimes referred to as the shuttle effect, lithiated polysulfides shuttle sulfur from the active cathode material through the electrolyte to plate onto the anode layer during charging. The shuttle effect both reduces storage capacity and increases internal resistance.

Based on information and belief, and without being limited to theory, agglomerates 140 initially lack or substantially lack elemental sulfur (less than 2 wt %). When device 100 is first discharged, the sulfurized carbon reduces lithium ions to form lithium sulfides. Components of electrolyte 115 also reduce within and between sulfurized-carbon particles 145 to form a matrix of solid-electrolyte interface (SEI) that extends through agglomerates 140. The SEI matrix traps the polysulfides but is an ion conductor. During charging, the SEI matrix and associated carbon retains the sulfur and allows lithium ions to escape back through electrolyte 115 to anode layer 125. The SEI matrix continues to retain the sulfur over subsequent charge/discharge cycling.

FIG. 1, at bottom, graphically depicts an exemplary sulfurized-carbon agglomerate 140 of cathode layer 135. Binder 150 of, e.g., carbon black is omitted. The average agglomerate 140 is a particle that approximates an ellipsoid (e.g., approximately spheroid), in this example, with average principal axes of between 500 and 5,000 nanometers. In the case of a sphere, an ellipsoid in which the three principal axes are equal, the average agglomerate 140 has a diameter of between one and five microns. Agglomerates 140 can be of different dimensions and shapes in other embodiments.

Carbon nanomaterials 155 are represented by circuitous strands of multi-wall carbon nanotubes that extend within and between sulfurized-carbon particles 145. Particles 145 are, like agglomerates 140, ellipsoid in this example but with sub-micron average principal axes of, e.g., 50 to 250 nanometers. Other carbon nanomaterials can be used with or instead of carbon nanotubes, such as nanoribbons or nanoplatelets. In general, a carbon nanomaterial contains particles, in an unbonded state or as an aggregate or as an agglomerate, with at least half the particles having a minimum dimension less than one hundred nanometers. Carbon nanomaterials 155 reduce thermal and electrical impedance within and between agglomerates 140 and particles 145, improve material strength to accommodate expansion and contraction, and may improve electrolyte whetting of the sulfurized-carbon material for improved ion conduction.

Particles 145 consist essentially of sulfur, carbon, and nitrogen, predominantly sulfur and carbon. Trace amounts of other elements might also be included, such as from atmospheric or material contaminants. The sulfur, prior to cathode lithiation, is believed to be composed mainly of small sulfur chains ($S_2$-$S_3$) chemically bonded to carbon. Agglomerates 140 and the encompassing carbon—collectively the active cathode material—consist primarily of sulfur. The active cathode material lacks oxygen, which advantageously reduces the risk of combustion. In some embodiments the sulfur in the active cathode material is essentially all bonded to carbon either directly or via one or more other sulfur atoms prior to lithiation.

Based on information and belief, and without being limited to theory, lithium breaks the carbon-sulfur bonds to form lithium sulfide compounds ($LiS_x$) during cell discharge. Electrolyte components of solvent and salt reduce within and between sulfurized-carbon particles 145 to form the SEI Electrolytes with high lithium concentrations in organic solvents work well with lithium anodes for cycling stability. Electrolyte 115 has a concentration of at least 2 mol/L in some embodiments.

U.S. Patent Appl. Publ. No. 2019/0181425, filed Feb. 26, 2019, published Jun. 13, 2019, and entitled "Anodes, Cathodes, and Separators for Batteries and Methods to Make and Use the Same," (the "Tour '425 Patent Application") details separators, electrolytes, and anodes that can be combined with cathode 105 to form embodiments of storage device 100 and is incorporated herein by reference to the extent that it provides exemplary, procedural, or other details supplementary to those set forth herein. This writing takes precedence over the incorporated materials, including the Tour '425 Patent Application, for purposes of claim construction.

Figure 2:
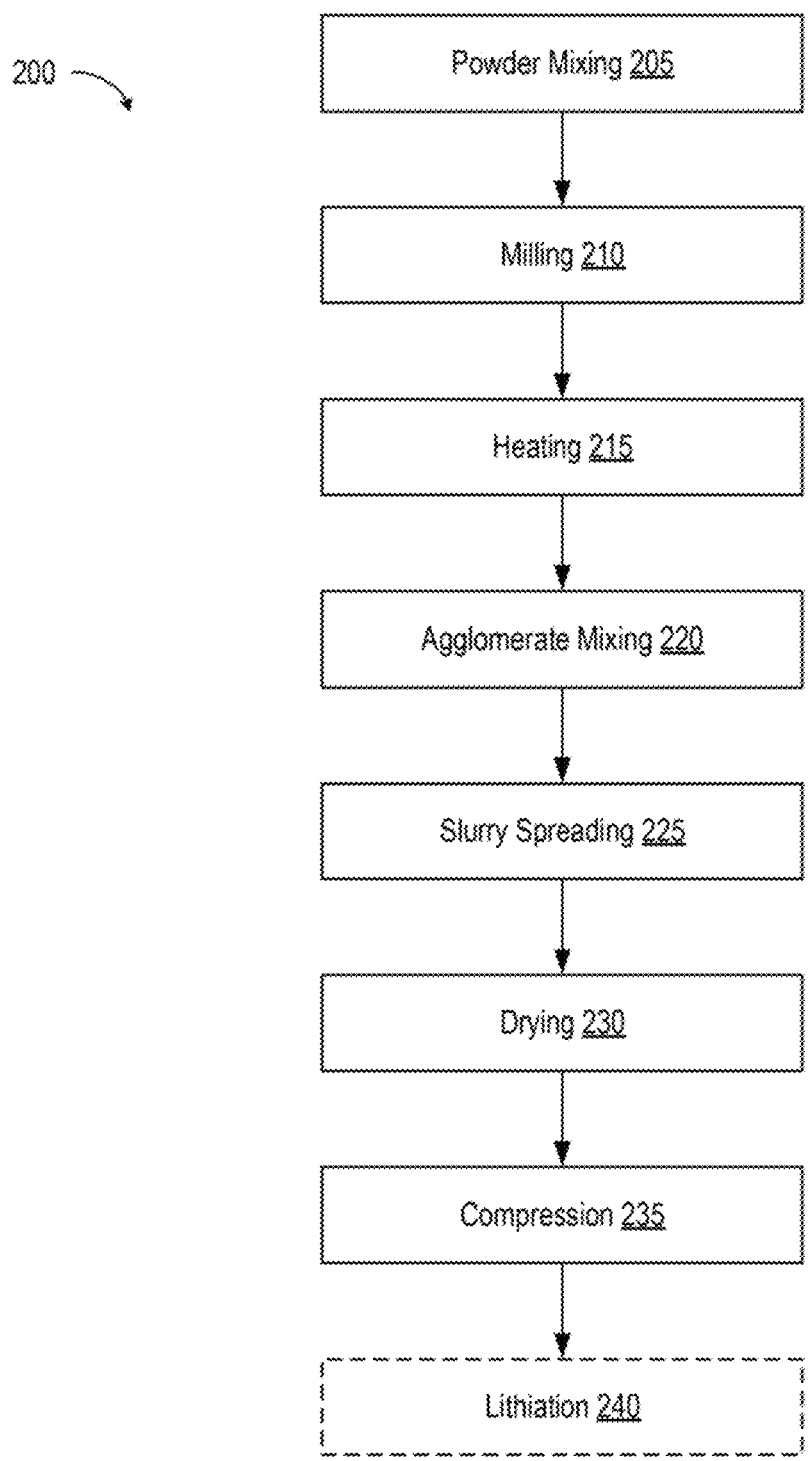
FIG. 2 depicts a method of making a cathode, an electrode for an energy-storage device in accordance with one embodiment.

FIG. 2 depicts a method 200 of making cathode 105, an electrode for an energy-storage device in accordance with one embodiment. First, at step 205, powders of sulfur, polyacrylonitrile (PAN), and multi-wall carbon nanotubes (MWCNTs) are mixed in a mass ratio of 55:11:1. Next (at step 210), the mixture from step 205 is ground and blended to form granules of sulfur/PAN particles interlaced with carbon nanotubes. Grinding and blending is performed using a ball mill in one embodiment. The ball milling process can convert the sulfur/PAN and carbon nanotube powder mixture into packed granules. The resultant granules are then pyrolyzed (at step 215) in a furnace, heated in an inert atmosphere of, e.g., argon or nitrogen, for, e.g., six hours at 450° C. This heat treatment carbonizes the PAN by driving off constituent hydrogen and nitrogen and incorporating sulfur, though levels of nitrogen can remain after the process. Steps 205 through 215 can be carried out absent some or all of the carbon nanomaterial (e.g., carbon nanotubes) to make sulfurized-carbon granules. Carbon nanomaterials or additional carbon nanomaterials of the same or a different type (e.g., ribbons versus tubes of the same or different lengths) can then be incorporated with the sulfurized-carbon granules via mixing and heating.

In an example in which the mass ratio of 55:11:1 for S:PAN:MWCNT was used in step 205 (as in 55 g of S, 11 g of PAN, and 1 g of MWCNT), the material yield after heat treatment of step 215 was 26 to 28 percent by mass, of which about 5.7 wt % was MWCNT. The resultant sulfurized carbon material (SC) can be further combined with a binder, such as PVDF, and a carbon additive to produce a cathode composition. The content of SC in this cathode composition can vary from, e.g., 80 to 95% in weight.

Figure 3A:
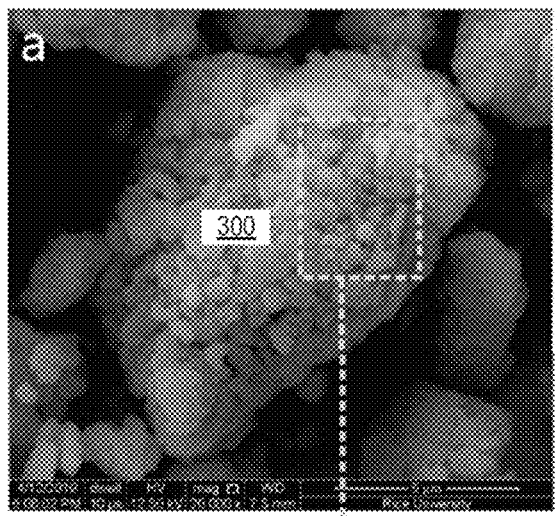
FIGS. 3A-3D are SEM images that compare the morphology of agglomerates with MWCNT powder during heat treatment (FIGS. 3B and 3D) with agglomerates prepared similarly but without MWCNT powder (FIGS. 3A and 3C).
Figure 3B:
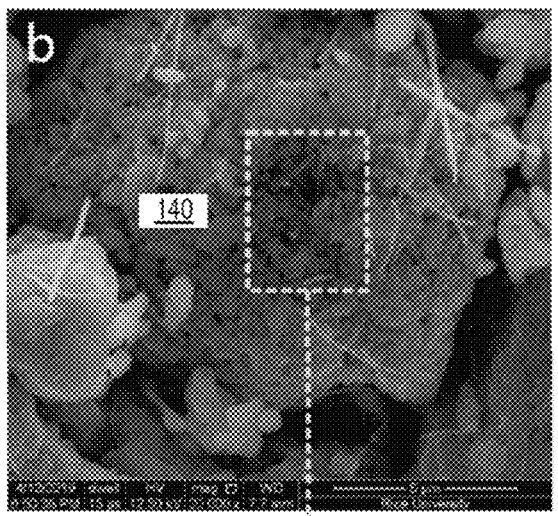
Figure 3C:
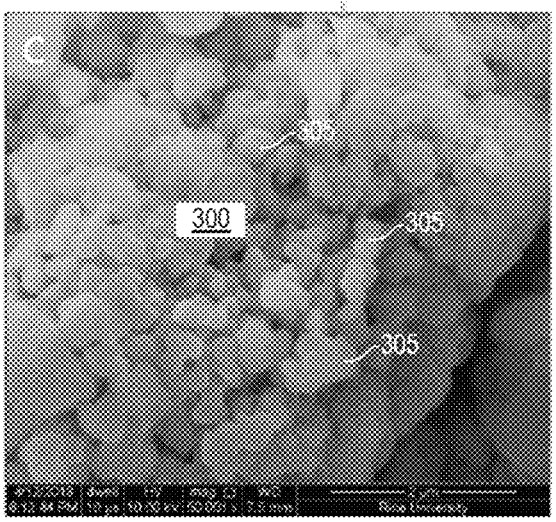
Figure 3D:
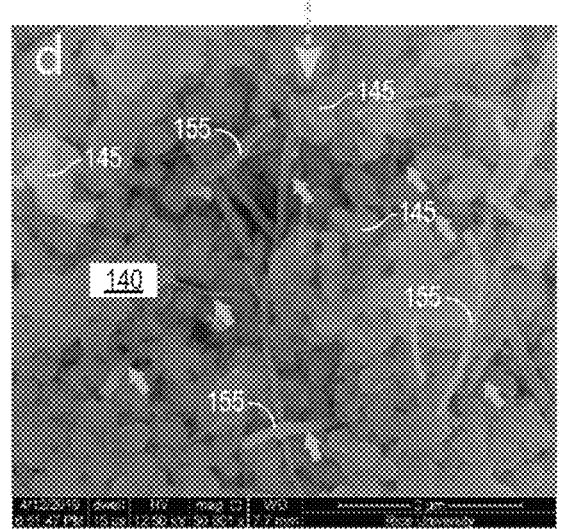

FIGS. 3A-3D compare the morphology of agglomerates 140 with MWCNT powder during heat treatment (FIGS. 3B and 3D) with agglomerates 300 prepared similarly but without MWCNT powder (FIGS. 3A and 3C). In general, the process of FIG. 2 yields spherical agglomerates with diameters between one and five microns. SEM analysis at higher magnifications (FIGS. 3C-3D) show that agglomerates 300 and 140 respectively include smaller particles 305 and 145 that are from about 200 to 500 nanometers in diameter. MWCNT powder added in step 205 yields MWCNT carbon nanomaterials 155 that are interlaced between particles 145 as noted above in connection with FIG. 1. MWCNTs can also be found outside agglomerates 140, bridging the spaces between them. Relatively short MWCNTs decorate the interior and walls of agglomerates 140, possibly resulting from shear forces used during mixing step 205.

FIGS. 4A-4D illustrate the morphology of agglomerates 400 produced in a method like that of FIG. 2 but in which MWCNT powder is added to a sulfurized-carbon mixture prepared without MWCNT through mixing, milling, and heating processes of steps 205, 210, and 215. Instead, 5.7 wt % of MWCNT powder was admixed after the heating of step 215. Agglomerates 400 of FIG. 4 are materially different from agglomerates 140 of FIGS. 3B and 3D.

The amount of MWNT was calculated to be the same as the SC produced in the presence of MWCNT (5.7 wt %). The mixing of the MWCNT and SC was performed in an agate mortar in air for five minutes. Although several MWCNTs 405 were found between sulfurized-carbon particles 410, none was observed within the body frame of agglomerates 400. Milling produces hard, dense agglomerates that advantageously include a large percentage of sulfur. These milled agglomerates are insulating, however, and resist electrolyte penetration. The presence of the MWCNTs 405 inside agglomerates 400 is thought to increase the electrical and thermal conductivity of the SC particles and produce an open structure that improves electrolyte access to the agglomerate interiors. This understanding is based in part on experiments showing that cathode layers produced with sulfurized carbon and an acetylene-black binder for electrode conductivity exhibit inferior electrical properties in comparison to similar layers with MWCNTs that extend within agglomerates and between sulfurized-carbon particles.

Returning to FIG. 2, agglomerates 140 from heating at step 215 are mixed with a powdered carbon, such as acetylene black, a binder and an organic solvent or water to form a slurry (at step 220). The binder and carbon additive can compose from 5 to 20% in weight of the solid mass. The slurry is then spread over a conductor (e.g. an aluminum foil) that will serve as current collector (at step 225). The slurry-coated foil is then dried (at step 230) by, e.g., heating in dry air. The dried cathode layer is compressed, e.g., by passing the foil between rollers. In an embodiment in which the dried slurry and underlying foil are together about 100 microns, for example, the compression reduces cathode-layer thickness to between sixty and seventy microns, depending on the mass loading, with little impact on the foil. Mass loading of sulfurized-carbon cathodes can be e.g. three to seven milligrams per square centimeter, with a final sulfur content of, e.g., 47 to 65 wt %.

The cathode with the dried, compressed cathode layer from step 235 can be incorporated into a lithium-metal cell. Lithium metal oxidized at the anode releases lithium ions through the electrolyte to the cathode during discharge. An optional lithiation process (step 240) may be used when the cathode from step 235 is to be incorporated into a lithium-ion cell. Lithium ions sourced from, e.g., lithium foil can be electrochemically intercalated into a carbon anode layer prior to cell assembly, for example.

Figure 5:
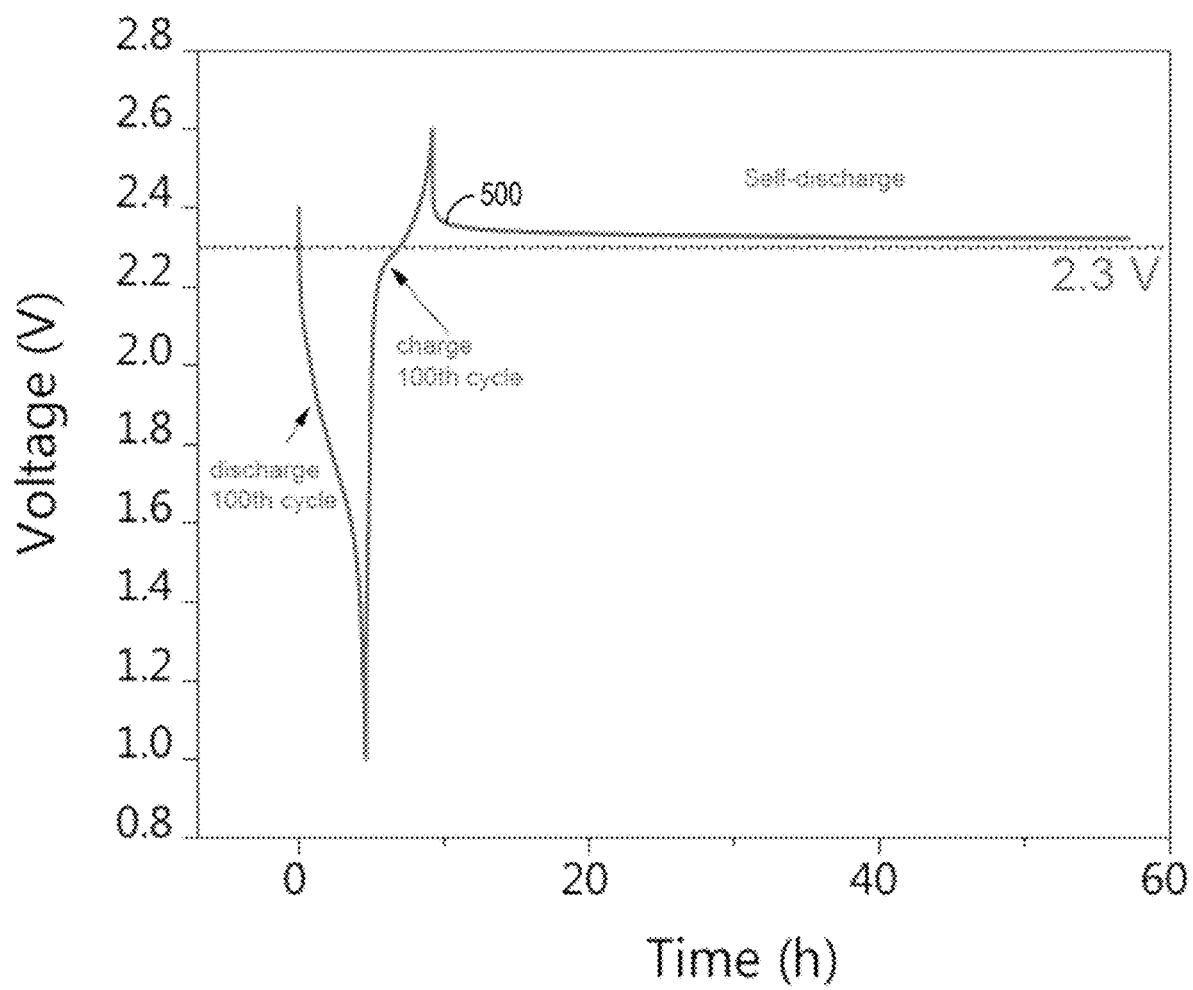
FIG. 5 depicts a graph of voltage versus time, in hours, for a pouch cell battery having a sulfurized-carbon cathode in accordance with one embodiment.

FIG. 5 depicts a graph with plot 500 of voltage versus time, in hours, for a pouch cell battery having a sulfurized-carbon cathode in accordance with one embodiment. Though not shown, the open-circuit potential (OCP) remained at about ~2.30±0.01 V for over five months (measured weekly using a regular multimeter). This cell, charged to 100% at 0.2C (108.21 mAh), was discharged after five months at 0.2C (107.63 mAh) to recover 99.46% of the charged capacity. This very low self-discharge even at months is indicative of a very stable cathode; ~0.1% capacity loss per month is an order of magnitude lower than the 1-2% self-discharge common in lithium-ion batteries.

Figure 6:
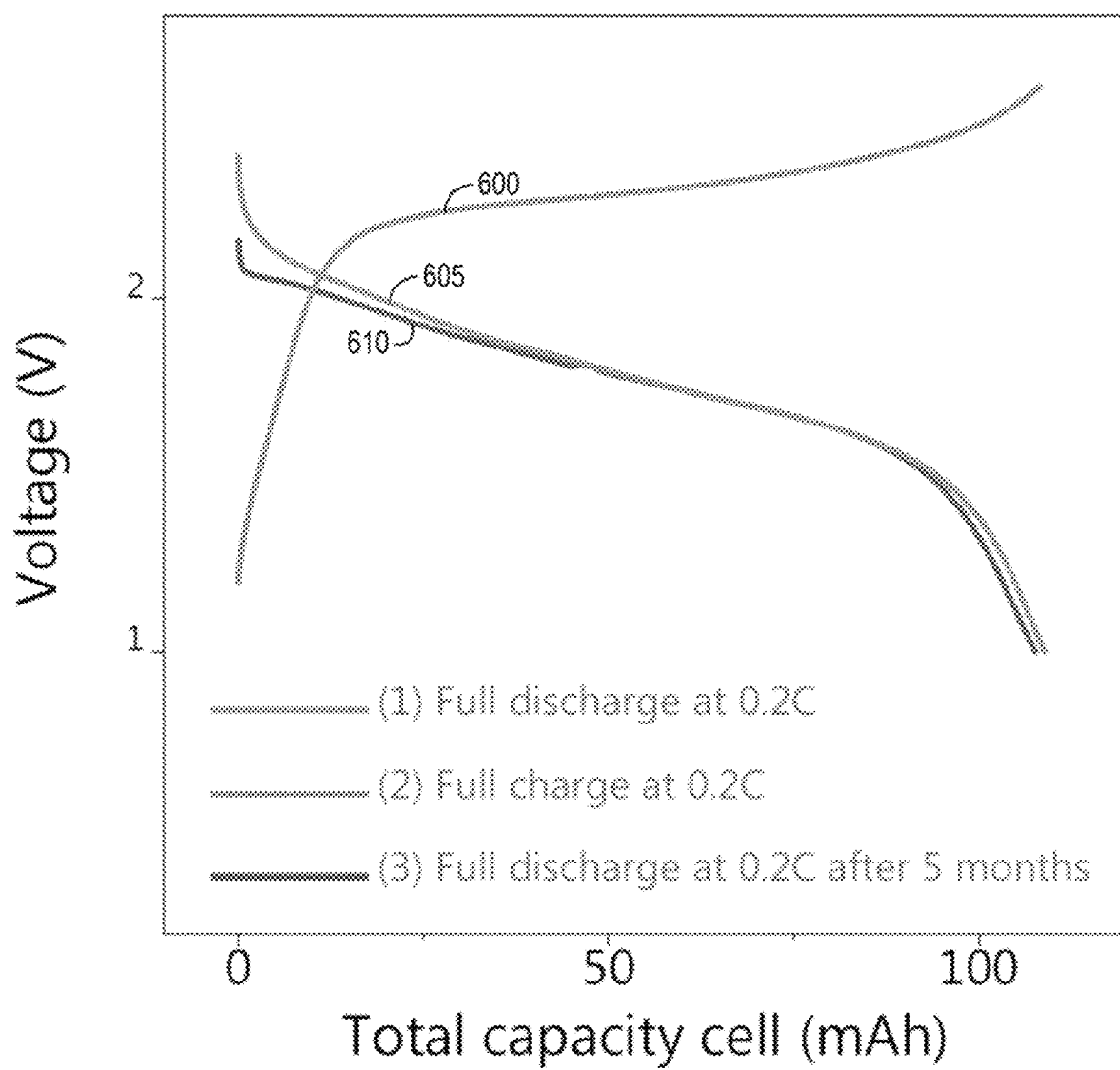
FIG. 6 depicts a self-discharge test of the pouch-cell battery discussed previously in connection with FIG. 5.

FIG. 6 depicts a self-discharge test of the pouch-cell battery discussed previously in connection with FIG. 5. A first plot 600 of voltage versus cell capacity (mAh) shows the relationship between voltage and capacity when the battery was charged at 0.2C. Plots 605 and 610 show the relationship between voltage and capacity for the same cell discharged at 0.2C, with plot 605 immediately following charging and with plot 610 after a delay of five months. The similarities of plots 605 and 610 evince excellent stability.

Furthermore, the sulfurized-carbon cathode made as described above, was tested and characterized. The cathode powder material was evaluated by different spectroscopy, microscopy and thermogravimetric techniques. The cathode was also tested in real cells to evaluate its ability to hold and release charge (gravimetric capacity and cycling stability). The results of such testing and characterization are shown in FIGS. 7A-7D.

Figure 7A:
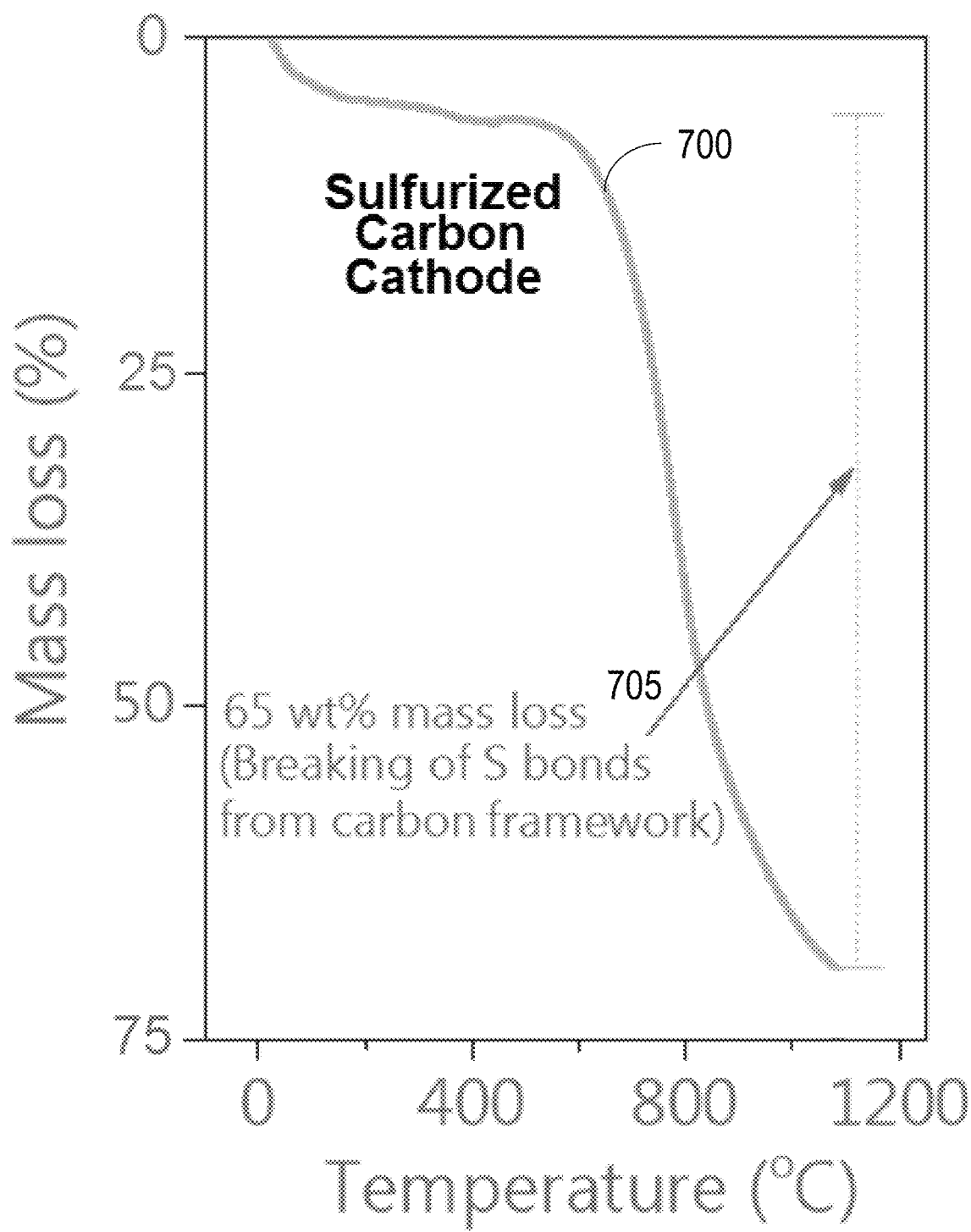
FIG. 7A is a graph showing mass loss versus temperature of a sulfurized-carbon cathode in accordance with one embodiment.

Such testing and characterization shows:

The active material (mainly sulfur) content in the cathode material in this embodiment was 65 wt %. As shown in FIG. 7A, plot 700 shows the decrease in mass percent of the sulfurized carbon cathode as temperature increased. Plot 700 intersected line 705 (showing the temperature of breaking of S bonds from the carbon framework) at around 65 wt %. Other prepared variants of the sulfurized carbon cathode materials prepared were found to contain greater than 70 wt % sulfur.

Figure 7B:
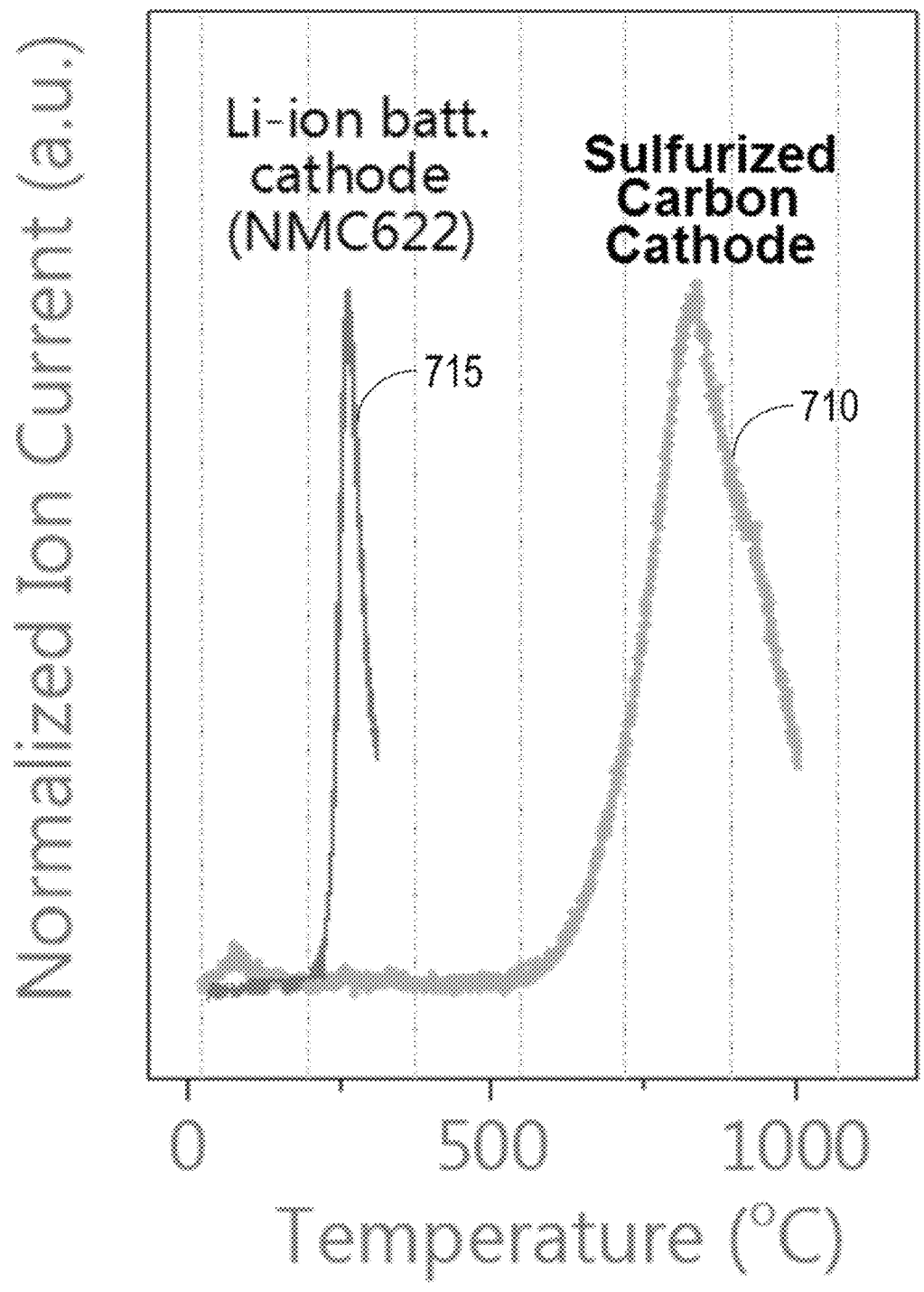
FIG. 7B is a graph showing temperature of decomposition of a sulfurized-carbon cathode in accordance with one embodiment and a commercial Li-ion cathode.

The onset temperature of cathode decomposition of this embodiment was greater than 600° C. Plot 710 in FIG. 7B shows the normalized ion current of the sulfurized-carbon cathode, which shows the decomposition at a temperature well above 600° C. (median temperature of almost 850° C.). This is in comparison with the normalized ion current of a commercial Li-ion cathode NMC622 (LiNi$_{0.6}$Mn$_{0.2}$Co$_{0.2}$O$_2$), which decomposition is shown in plot 715 and is consistent with reports in the literature. Thus, a regular sulfur cathode completely loses its sulfur by evaporation at a median temperature of 220-250° C. (depending on heating rate) based on thermogravimetric analysis (TGA). This relatively low decomposition temperature indicates that the sulfur is elemental sulfur. The sulfur in the sulfurized carbon cathodes detailed herein is lost at a median temperature of 850° C. This relatively high decomposition temperature indicates that the majority of the sulfur atoms in the sulfurized-carbon cathode are bonded to an adjacent carbon atom via a relatively strong, covalent, carbon-sulfur bond. In some embodiments, essentially all of the sulfur in the agglomerates of sulfurized-carbon particles are bonded to carbon, though some may be unbonded during cycling (i.e., moving charge carriers into and out of the cathode). Before cycling, the amount of elemental sulfur is less than 2 wt % of the total sulfur and the mass ratio of the carbon covalently bonded to the sulfur to the carbon nanomaterial is greater than one, and greater than ten in some embodiments.

Figure 7C:
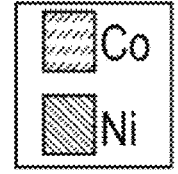
FIG. 7C is a graph showing a comparison of metal content of a sulfurized-carbon cathode in accordance with one embodiment and several commercial Li-ion cathodes.

The metal content of the cathode particles in the sulfurized carbon as compared to commercial Li-ion cathodes NMC811 (LiNi$_{0.8}$Mn$_{0.1}$Co$_{0.1}$O$_2$), NM622 (LiNi$_{0.6}$Mn$_{0.2}$Co$_{0.2}$O$_2$), NMC111 (LiNi$_{1/3}$Mn$_{1/3}$Co$_{1/3}$O$_2$), and LCO (LiCoO$_2$) is shown in FIG. 7C (in kg of metal per kWh).

Figure 7D:
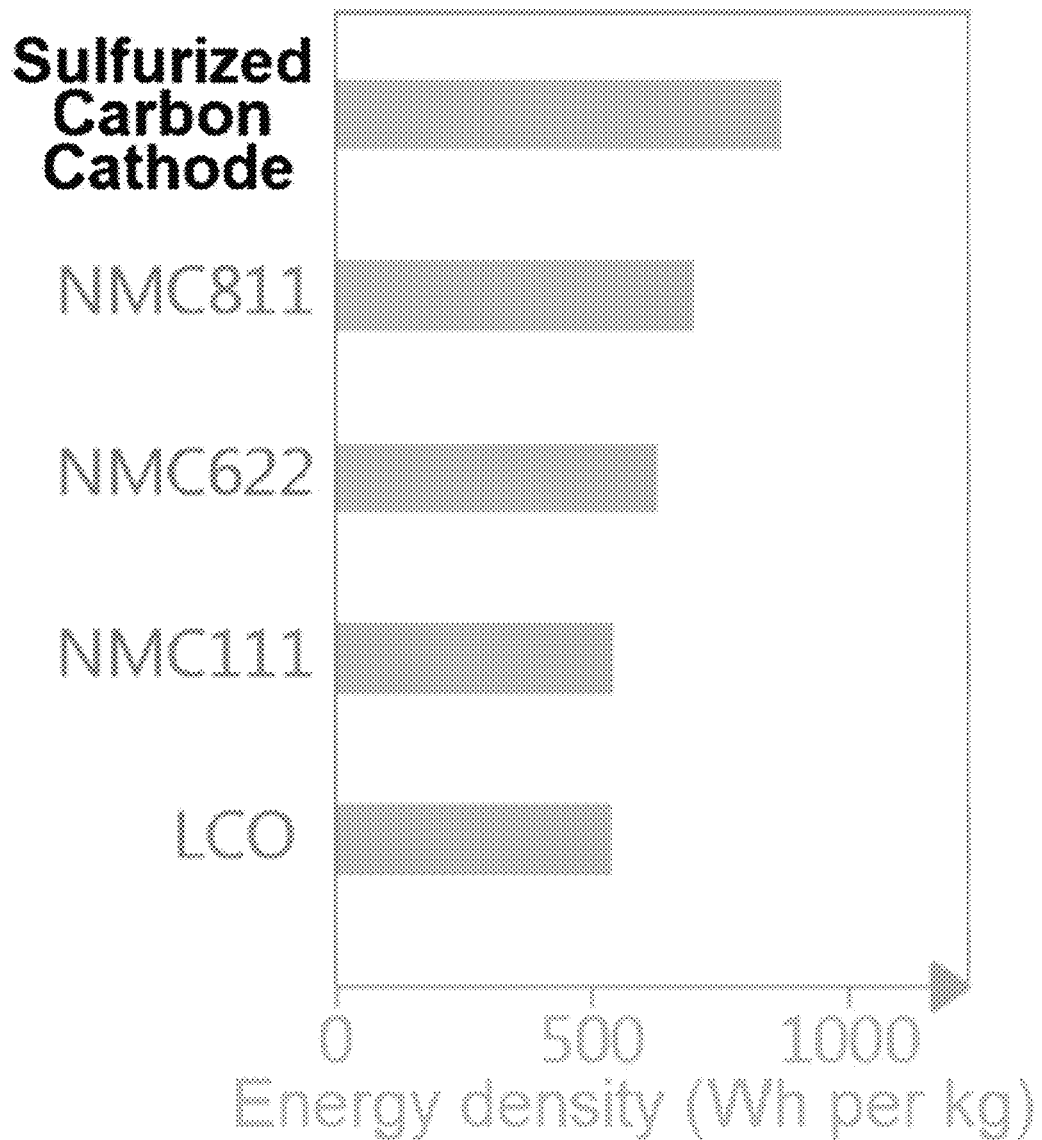
FIG. 7D is a graph showing a comparison of energy density of a sulfurized-carbon cathode in accordance with one embodiment and several commercial Li-ion cathodes.

The improved actual cathode energy density based on measured capacity and voltage for the sulfurized carbon as compared to commercial Li-ion cathodes NMC811, NM622, NMC111, and LCO is shown in FIG. 7D (in Wh per kg).

FIGS. 7A-7D show that the sulfur in the sulfurized carbon cathode is in a distinct state and the weight loss (shown in FIG. 7A) is due to chemical decomposition (breaking of carbon-sulfur bond), not mere evaporation (breaking of sulfur-sulfur bond). Thus, the bonding of the sulfur to the carbon framework and the significant energetic requirement to break the bonds in the sulfurized carbon cathode explain the fundamental nature, strength, and stability of the bonds. It is believed that it is the super-strong carbon-sulfur bonding of the sulfurized carbon cathode that prevents formation of lithium polysulfides upon lithiation (which is unlike regular sulfur cathode in a lithium battery), thus enabling cycling stability.

Testing has shown and confirmed the carbon-sulfur covalent bond at the atomic/molecular level. This supports that the sulfurized carbon cathode, in pristine or lithiated state, will prevent formation of hydrogen sulfide upon exposure to moisture or water. Though hydrogen sulfide formation will be supported by an increase in entropy due to conversion of a solid phase to gaseous phase of sulfur, the energetic barrier due to the strength of the carbon-sulfur bond will be so great that the enthalpy contribution to the Gibb's free energy will greatly overcome entropy in the driving force.

The foregoing discussion focuses on batteries that employ lithium ions as charge carriers. Other alkali metals (e.g., sodium, potassium, and magnesium) can also be used.

Cathode layers can include, e.g., selenium with the sulfurized carbon. Moreover, selenium and mixtures of sulfur and selenium can be used, either as powders containing sulfur and selenium in a determined ratio, or as compounds containing both elements, such as SeS$_2$ (selenium disulfide).

The polymer utilized can be varied such as by using different molecular weights polymers, co-polymers of PAN, or reticulated polymers.

The carbon nanomaterial can be varied, such as graphene nanoribbons and single-walled carbon nanotubes.

The powder ratios can be varied. For instance, S:PAN:C ratio can be used in amounts other than 55:11:1, such as 55:11:5, 55:11:0.5 and 55:11:0.25.

Additional variations of these embodiments will be obvious to those of ordinary skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. The scope of protection is not limited by the description set out above, but is only limited by the claims which follow, that scope including all equivalents of the subject matter of the claims.

Amounts and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc.

Representative methods, devices, and materials are described herein. Similar or equivalent methods, devices, and materials will be obvious to those of skill in the art in view of the forgoing teachings and can be used in the practice or testing of the presently disclosed subject matter.

Following long-standing patent law convention, the terms "a" and "an" mean "one or more" when used in this application, including the claims.

What is claimed is:

1. A cathode for an energy-storage device, wherein the cathode comprises:
   (a) distinct agglomerates of sulfurized-carbon particles, wherein
      (i) the sulfurized-carbon particles comprise first carbon atoms with adjacent sulfur atoms, and
      (ii) a majority of the carbon atoms with the adjacent sulfur atoms are bonded to the adjacent sulfur atoms via carbon-sulfur bonds; and
   (b) carbon nanomaterial with second carbon atoms and extending within the agglomerates of sulfurized-carbon particles and between the sulfurized-carbon particles.

2. The cathode of claim 1, wherein the carbon nanomaterial is covalently bonded to the sulfurized-carbon particles.

3. The cathode of claim 1, wherein at least 90% of the first and second carbon atoms with the adjacent sulfur atoms are bonded to the adjacent sulfur atoms via carbon-sulfur bonds.

4. The cathode of claim 1 further comprising a binder within which the agglomerates are distributed.

5. The cathode of claim 1, wherein the particles comprise less than 10% oxygen in mass ratio.

6. The cathode of claim 1, wherein the agglomerates of sulfurized-carbon particles are ellipsoid.

7. The cathode of claim 6, wherein the agglomerates of sulfurized-carbon particles have average principal axes of between 500 nanometers and 5,000 nanometers.

8. The cathode of claim 7, wherein the sulfurized-carbon particles are ellipsoid.

9. The cathode of claim 8, wherein the sulfurized-carbon particles have average principal axes of less than one micron.

10. The cathode of claim 9, wherein the average of the principal axes of the sulfurized-carbon particles is between 50 nanometers and 250 nanometers.

11. The cathode of claim 1, wherein the carbon nanomaterial extends within and between the sulfurized-carbon particles.

12. The cathode of claim 1, wherein the carbon nanomaterial comprises at least one of nanotubes and nanoribbons.

13. The cathode of claim 1, wherein the sulfurized-carbon particles store an alkali metal.

14. The cathode of claim 13, wherein the sulfurized-carbon particles consist primarily of the sulfur atoms.

15. The cathode of claim 14, wherein the sulfurized-carbon particles consist essentially of the second carbon atoms and the sulfur atoms.

16. The cathode of claim 15, wherein the carbon comprises the first and second carbon atoms.

17. The cathode of claim 16, wherein the agglomerates of sulfurized-carbon particles have a mass ratio of the carbon covalently bonded to the sulfur and the carbon nanomaterial greater than one.

18. The cathode of claim 17, wherein the mass ratio is greater than ten.

19. The cathode of claim 1, wherein essentially all the sulfur atoms in the agglomerates of sulfurized-carbon particles is bonded to the carbon of at least one of the first carbon atoms and the second carbon atoms before cycling of the energy-storage device.

* * * * *